United States Patent Office 3,413,362
Patented Nov. 26, 1968

3,413,362
PROCESS FOR THE PREPARATION OF
1-CHLORO-1-FLUOROETHANE
Hitoshi Otaku, Kawasaki, Japan, assignor to Denki
Kagaku Kogyo Kabushiki Kaisha, Tokyo, Japan
No Drawing. Filed June 2, 1967, Ser. No. 643,070
Claims priority, application Japan, June 4, 1966,
41/35,692
8 Claims. (Cl. 260—653.6)

ABSTRACT OF THE DISCLOSURE

A process for producing 1-chloro-1-fluoroethane by the vapor phase reaction of vinyl chloride with anhydrous hydrogen fluoride using fluorosulfonic acid carried on an active carbon as a catalyst.

BACKGROUND OF THE INVENTION

The present invention relates to a process for the preparation of 1-choloro-1-fluoroethane by the vapor phase reaction of vinyl chloride and hydrogen fluoride.

Prior art.—It has been known that 1-chloro-1-fluoroethane may be prepared by reacting vinyl chloride with hydrogen fluoride in the absence of a catalyst under pressure (German Patent No. 859,887). However, this known process is economically inferior because of the rate of the reaction and the yields of product where the desired product of the reaction is 1-chloro-1-fluoroethane.

On the other hand, it has been proposed to carry out the reaction of vinyl chloride and hydrogen fluoride in anhydrous hydrogen fluoride using a material acting as an acid, such as, fluorosulfonic acid as a catalyst (United States Patent 2,462,359). According to this method, a mixed gas of vinyl chloride and hydrogen fluoride is blown into a liquid catalyst or a vinyl chloride gas is blown into liquid anhydrous hydrogen fluoride having dissolved therein the catalyst. However, since 1-chloro-1-fluoroethane is easily dissolved in hydrogen fluoride and the catalyst, an undesirable side reaction occurs, whereby the liquid catalyst becomes colored brown at the start of reaction. Moreover, the viscosity of the reaction liquid is gradually increased. Therefore, a part of the catalyst must be replaced with fresh catalyst every 50–100 hours in such a reaction system. Furthermore, since the reaction system is a vapor-liquid contact system, it is difficult to control the contact time. Thus, it is very difficult to increase the conversion of vinyl chloride to over 90%.

Moreover, it is a further disadvantage that the material used as a catalyst, that is, the material acting as an acid in anhydrous hydrogen fluoride acts also as a fluorine substituting agent. For example, where vinyl chloride is reacted with hydrogen fluoride using fluorosulfonic acid as a catalyst, 1,1-difluoroethane is formed in the gas product at a ratio of 5–25%. This is also true when sulfuric acid is used as a catalyst since fluorosulfonic acid is formed by the following reaction:

$$HF + H_2SO_4$$
$$H_2O + HSO_3F$$

Brief description of the invention.—It is an object of the present invention to prepare 1-chloro-1-fluoroethane in high yields by reacting vinyl chloride with hydrogen fluoride in the vapor phase using fluorosulfonic acid carried on an active carbon as a catalyst.

It is known that the catalyst prepared by impregnating a carrier, such as silica or diatomaceous earth with sulfuric acid or phosphoric acid and that a carrier containing sublimed aluminum chloride acts as Bronsted acid or Lewis acid in a reaction, such as the polymerization of olefins or the alkylation thereof and hence is a very effective catalyst in such cases.

However, it has not been known what results will occur when such a solid acid catalyst is employed in preparing 1-chloro-1-fluoroethane by reacting vinyl chloride with hydrogen fluoride. Accordingly, as above-mentioned, the preparation of 1-chloro-1-fluoroethane has hitherto been conducted by blowing vinyl chloride or a gas mixture of vinyl chloride and hydrogen fluoride into a liquid catalyst consisting of liquid hydrogen fluoride and fluorosulfonic acid or sulfuric acid.

DETAILED DESCRIPTION OF THE INVENTION

The inventors have found that by fixing the acid catalyst on an active carbon, the occurrence of the side reactions caused by the very high solubility of 1-chloro-1-fluoroethane into the liquid catalyst can be restrained, that the production of the side product, 1,1-difluoroethane caused by the properties associated with the liquid catalyst itself as a substituting agent can be suppressed, and that, simultaneously, the contact time in the reaction system can be controlled.

Moreover, it has been found that by using fluorosulfonic acid carried on an active carbon, not only can the effective area for reaction be increased and the active area broadened to improve the contact of the catalyst with the reaction materials but also the suppression of the occurrence of the side reaction caused by the structural characteristics of the catalyst. These unexpected results were hitherto impossible in the conventional liquid catalyst system. According to the invention, the activity of the catalyst is endowed with selectivity by the co-action of an active carbon and fluorosulfonic acid.

According to the invention, vinyl chloride is caused to react with hydrogen fluoride in the vapor phase at a substantially atmospheric pressure and a temperature of 20–100° C., preferably, 20–70° C., in the presence of the solid catalyst system consisting of an active carbon and fluorosulfonic acid which contains 5–60% by weight, preferably 10–45% by weight of fluorosulfonic acid.

The catalyst used in this invention may be prepared by impregnating an active carbon with fluorosulfonic acid. The active carbon which can be employed in the present invention may be any of those commercially available. The reaction is not influenced by the form and the size of the carbon particles. However, since the reaction is usually carried out in a cylindrical reactor, it is desirable in such a case to employ the granular active carbon having a diameter of about 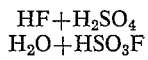 of the diameter of the reactor.

The fluorosulfonic acid used in this invention is substantially anhydrous. In order to carry fluorosulfonic acid on an active carbon, various methods may be adopted, such as, for example, by immersing active carbon particles in fluorosulfonic acid or by immersing an active carbon in anhydrous hydrogen fluoride containing therein fluorosulfonic acid. The relative ratio of active carbon and fluorosulfonic acid in the catalyst thus prepared may be widely varied, but in general, it is preferable that the content of fluorosulfonic acid in the catalyst be 5–60% by weight, preferably 10–45% by weight. If the concentration of the acid is less than 5% by weight, the conversion of vinyl chloride will be lowered, while if the concentration is higher than 60% by weight, the formation of 1,1-difluoroethane will be increased by the fluorine-substituting action of the free fluorosulfonic acid which is present in the system besides the fluorosulfonic acid carried on an active carbon. In other words, the selectivity of the reaction will be reduced rapidly.

In the case of carrying out the reaction by introducing in the reactor vinyl chloride and anhydrous hydrogen fluoride, it is important to employ a reaction temperature at which vinyl chloride and anhydrous hydrogen fluoride are maintained in vapor phase. The reaction may be usually carried out at temperatures higher than 20° C. Also, in general, the reaction may be conducted at a high temperature of 100° C., however, no significant advantages are achieved thereby. Further, the reaction may be conducted at a low temperature, however, it is desirable to maintain the reaction system at a temperature of 20–70° C.; the fluorosulfonic acid in the catalyst being sufficiently carried on an active carbon at these temperatures. Hence, the catalyst maintains its activity over a long period of time. If necessary, fluorosulfonic acid may be supplied in the system by introducing the acid, for example, from the top of the reactor. The fluorosulfonic acid may be supplied by using the acid alone or the acid diluted with anhydrous hydrogen fluoride.

It can be considered that no liquid hydrogen fluoride is present in the reaction system. Accordingly, there occurs no side reaction caused by the dissolution of the raw material, vinyl chloride and 1-chloro-1-fluoroethane formed and hence, there is no formation of tar.

The reaction may be carried out under a substantially atmospheric pressure. That is, if a reaction temperature is employed at which the reaction can be conducted in substantial vapor phase, the reaction may be conducted under a high pressure or a reduced pressure; however, if the reaction is conducted at an atmospheric pressure, it can be controlled more easily.

Although the theoretical mol ratio of hydrogen fluoride to vinyl chloride required in the reaction is 1:1, it is desirable to use an excessive amount of hydrogen fluoride. It is preferable to carry out the reaction at the mol ratio of 1:1 to 10:1, preferably 3:1 to 7:1.

The contact time may be varied widely without sacrificing the reaction rate. In general, the contact time of 1–120 seconds may be employed but it is desirable that the reaction be carried out for 5–20 seconds. Generally speaking, the reaction rate is influenced by the mol ratio of the raw materials and the contact time but if the reaction is carried out at the above-mentioned ratios and the contact times, a high reaction rate and a high yield are obtained and industrially desirable results can be obtained as compared with the conventional method in which the raw materials are blown into the liquid catalyst.

The produced gases contain almost no 1,1-difluoroethane but, in general, after removing unreacted hydrogen fluoride by a conventional method, for example, by distillation or washing, followed by drying, the product is subjected to fractionation to recover substantially pure 1-chloro-1-fluoroethane.

The invention will further be explained practically by the following examples.

Example 1

A mixture of 57 g. of anhydrous fluorosulfonic acid and 65 ml. of substantially anhydrous hydrogen fluoride was absorbed on 300 ml. of an active carbon having a grain size of 3 mm. x 3 mm. (diameter×height). The active carbon to be used was dried for one day at a temperature of 130° C. The catalyst was filled in an aluminum reactor of 30 mm. in inside diameter and 700 mm. in length. The reactor was equipped with an inlet for the raw materials, vinyl chloride and gaseous anhydrous hydrogen fluoride and, if necessary, an inlet for fluorosulfonic acid at the top portion and also an outlet for withdrawing the product gases and also a case for inserting a thermometer for measuring the temperature in the catalyst at the lower portion. Dry nitrogen was passed through gradually the reactor filled with the catalyst at about 50° C. to remove the greater part of hydrogen fluoride used so that fluorosulfonic acid is uniformly adsorbed on the active carbon.

Thereafter, while maintaining the inside temperature of the catalyst layer at about 30° C., a mixed gas of vinyl chloride and anhydrous hydrogen fluoride in a mol ratio of 6.4 (hydrogen fluoride/vinyl chloride) was passed through the catalyst layer under an atmospheric pressure such that the contact period of time was 9 seconds. The gases withdrawn from the reactor were washed with water and an aqueous alkali solution to remove unreacted hydrogen fluoride and, after being dried by soda lime, collected in a trap. After continuing the reaction for 16 hours, the product obtained was analyzed by means of a gas chromatograph. The results showed that the conversion of vinyl chloride, was 97.5%, and the yield of 1-chloro-1-fluoroethane to vinyl chloride reacted was 98.8%. The amount of 1,1-difluoroethane side-produced was, however, only 0.9% of the total amount of the product.

Example 2

Adsorbed on 300 ml. of dry active carbon having a grain size of 3 mm. x 3 mm. (diameter×length) was 100 g. of anhydrous fluorosulfonic acid, and the catalyst thus prepared was filled in the reactor as in Example 1. A mixed gas of hydrogen fluoride and vinyl chloride in a mol ratio of 4.6 was introduced into the reactor under an atmospheric pressure such that the contact time was 16 seconds. Conversion of vinyl chloride was 98.0% and the yield of 1-chloro-1-fluoroethane was 98.7%.

Comparative Example 1

Charged into a cylindrical reactor made of polytrifluorochloroethylene and having an inside diameter of 30 mm. and a depth of 700 mm. was 250 ml. of substantially anhydrous liquid hydrogen fluoride containing 25% by weight of fluorosulfonic acid as a catalyst. The reactor has at the bottom about 60 fine holes (diameter of about 1 mm.) for blowing vinyl chloride into the reactor and through the fine holes was blown into the liquid catalyst 150 ml. per minute of vinyl chloride. The reactor was also equipped with an outlet for produced gases and an inlet for supplying liquid hydrogen fluoride at the top portion. The loss of hydrogen fluoride lost by the reaction and carried out of the reaction system during reaction was compensated by introducing hydrogen fluoride through the inlet. After removing an acid component by a conventional manner, the product gas was collected and analyzed. The results showed that by conducting the reaction maintaining the temperature of the liquid catalyst at about 20° C., the conversion of vinyl chloride was 94.5% and the yield of 1-chloro-1-fluoroethane was 59.6%.

Comparative Example 2

The same procedure as in Example 1 was repeated using the catalyst prepared by adsorbing 110 g. of anhydrous fluorosulfonic acid on 260 g. of aluminum fluoride pellets of 3 mm. x 3 mm. (diameter×length) under the same conditions as in Example 1. The conversion of vinyl chloride, was 74.6% and the yield of 1-chloro-1-fluoroethane was 65.5%. After continuing the reaction for 8 hours, the catalyst was withdrawn, the surface of which was observed to be covered by a tar-like black-brown material.

While the invention has been particularly shown and described with reference to a preferred embodiment thereof, it will be understood by those skilled in the art that various changes in form and details may be made therein without departing from the spirit and scope of the invention.

What is claimed is:

1. A process for the preparation of 1-chloro-1-fluoroethane which comprises reacting vinyl chloride with anhydrous hydrogen fluoride in the vapor phase at a temperature of 20–100° C. in the presence of a solid catalyst consisting essentially of an active carbon impregnated with from 5–60% by weight of fluorosulfonic acid.

2. The process for the preparation of 1-chloro-1-fluoroethane as claimed in claim 1 wherein said reaction is carried out at a substantially atmospheric pressure.

3. The process for the preparation of 1-chloro-1-fluoroethane as claimed in claim 1 wherein the mol ratio of hydrogen fluoride to vinyl chloride in the reaction system is from 1:1 to 10:1.

4. The process for the preparation of 1-chloro-1-fluoroethane as claimed in claim 1 wherein the contact time during reaction is from 1 to 120 seconds.

5. The process for the preparation of 1-chloro-1-fluoroethane as claimed in claim 1 wherein said solid catalyst is prepared by immersing the active carbon in fluorosulfonic acid followed by drying.

6. The process for the preparation of 1-chloro-1-fluoroethane as claimed in claim 1 wherein said solid catalyst is prepared by immersing the active carbon in liquid anhydrous hydrogen fluoride containing fluorosulfonic acid followed by drying.

7. The process of claim 1 wherein the mol ratio of hydrogen fluoride to vinyl chloride in the reaction system is from 3:1 to 7:1.

8. The process of claim 1 wherein the contact time during reaction is from 5 to 20 seconds.

References Cited
UNITED STATES PATENTS

| | | | |
|---|---|---|---|
| 1,996,115 | 4/1935 | Lazier | 260—653.6 |
| 2,446,124 | 7/1948 | Boyd | 260—653.4 |
| 2,462,359 | 2/1949 | Calfee et al. | 260—653.4 |

DANIEL D. HORWITZ, *Primary Examiner.*

UNITED STATES PATENT OFFICE
CERTIFICATE OF CORRECTION

Patent No. 3,413,362 November 26, 1968

Hitoshi Otaku

It is certified that error appears in the above identified patent and that said Letters Patent are hereby corrected as shown below:

Column 1, lines 58 to 60, the formula should appear as shown below:

$$HF + H_2SO_4 \rightleftharpoons H_2O + HSO_3F$$

Signed and sealed this 7th day of April 1970.

(SEAL)
Attest:

Edward M. Fletcher, Jr.
Attesting Officer

WILLIAM E. SCHUYLER, JR.
Commissioner of Patents